United States Patent
Yamauchi

(10) Patent No.: US 10,458,471 B2
(45) Date of Patent: Oct. 29, 2019

(54) SLIDING MEMBER

(71) Applicant: DAIDO METAL COMPANY LTD., Nagoya (JP)

(72) Inventor: Takayoshi Yamauchi, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 15/914,002

(22) Filed: Mar. 7, 2018

(65) Prior Publication Data

US 2018/0258990 A1  Sep. 13, 2018

(30) Foreign Application Priority Data

Mar. 7, 2017 (JP) .................. 2017-042868

(51) Int. Cl.
*F16C 33/12* (2006.01)
*F16C 17/00* (2006.01)
*F16C 33/20* (2006.01)
(Continued)

(52) U.S. Cl.
CPC ............ *F16C 33/121* (2013.01); *F16C 17/00* (2013.01); *F16C 17/02* (2013.01); *F16C 33/122* (2013.01); *F16C 33/125* (2013.01); *F16C 33/127* (2013.01); *F16C 33/201* (2013.01); *F16C 33/205* (2013.01); *B29C 45/0005* (2013.01);
(Continued)

(58) Field of Classification Search
CPC ........... F16L 7/00; F16C 17/02; F16C 33/121; F16C 33/122; F16C 33/125; F16C 33/127; F16C 33/201; F16C 33/205; F16C 33/208; F16C 33/046; F16C 2208/02; F16C 2208/04; F16C 2208/20; F16C 2208/36; F16C 2208/58; C08J 5/042; C08J 5/043; B29C 45/0005; Y10T 429/249942; Y10T 429/249946; Y10T 429/249995

USPC ....... 384/125, 129, 276, 279, 297, 300, 902, 384/907.1, 908, 912; 428/361, 370, 383, 428/411.1, 549–551

See application file for complete search history.

(56) References Cited

U.S. PATENT DOCUMENTS 3,556,915 A * 1/1971 Stanley et al. .......... B32B 27/00
428/339
4,623,590 A * 11/1986 Hodes ...................... C08K 7/02
428/408
(Continued)

FOREIGN PATENT DOCUMENTS

JP  H10-204282 A  8/1998
JP  2013-194204 A  9/2013
(Continued)

*Primary Examiner* — Marcus Charles
(74) *Attorney, Agent, or Firm* — Snyder, Clark, Lesch & Chung, LLP

(57) ABSTRACT

Provided is a partially-annular sliding member including a sliding layer including fibrous particles having an average particle size of 5-25 μm dispersed in a synthetic resin at a volume ratio of 10-35% of the sliding layer. The particles having a major axis length≤20 μm are included at a volume ratio of ≥10% to total particles. A sliding surface side area is defined from the sliding surface and has a thickness of 25% of a sliding layer thickness T, where the fibrous particles having a major axis length of ≥20 μm have a dispersion index of 1.1-6. An interface side area is defined from the interface and has a thickness of 25% of T, where the dispersion index is 1.1-6. An intermediate area is defined between the both areas, where the dispersion index is 0.1 to less than 1.

11 Claims, 3 Drawing Sheets

(51) Int. Cl.
*F16C 17/02* (2006.01)
*C08J 5/04* (2006.01)
*B29C 45/00* (2006.01)

(52) U.S. Cl.
CPC .............. *C08J 5/042* (2013.01); *C08J 5/043* (2013.01); *F16C 2208/02* (2013.01); *F16C 2208/04* (2013.01); *F16C 2208/20* (2013.01); *Y10T 428/249942* (2015.04); *Y10T 428/249946* (2015.04)

(56) References Cited

U.S. PATENT DOCUMENTS

| | | | | |
|---|---|---|---|---|
| 4,923,761 | A * | 5/1990 | Shindo | F16C 33/201 384/463 |
| 8,967,870 | B2 * | 3/2015 | Ishii | F16C 33/22 384/129 |
| 9,296,175 | B2 * | 3/2016 | Yamaguchi | B29C 45/0005 |
| 2008/0161117 | A1 * | 7/2008 | Riahi | B29C 70/32 464/128 |
| 2010/0276082 | A1 * | 11/2010 | Park | F42B 14/061 156/276 |
| 2011/0026864 | A1 * | 2/2011 | Than Trong | F16C 17/02 384/420 |
| 2015/0018254 | A1 * | 1/2015 | Araujo | F16J 9/26 508/105 |
| 2015/0125101 | A1 * | 5/2015 | Kachoosangi | F16C 33/201 384/129 |

FOREIGN PATENT DOCUMENTS

| | | | |
|---|---|---|---|
| JP | 2015-94373 A | 5/2015 | |
| JP | 2016-079391 A | 5/2016 | |
| WO | WO 2015111574 A1 * | 7/2015 | ............... C08J 5/24 |

* cited by examiner

SLIDING MEMBER

BACKGROUND OF THE INVENTION

Field of the Invention

The present invention relates to a sliding member for a thrust bearing. Particularly, the invention relates to a sliding member having a partially annular shape and including a back metal layer and a sliding layer including synthetic resin and fibrous particles. The invention further relates to a thrust bearing including the sliding member.

Description of the Related Art

A thrust bearing has been used for a rotation shaft of an exhaust turbine, a large-scale electrical generator or other devices. Such thrust bearing includes a plurality of sliding members each having a partially annular bearing pad shape and the sliding members are arranged along a circumferential direction and facing a thrust collar surface of the rotation shaft. In such a tilting pad type thrust bearing, each of the sliding members having the partially annular shape is supported by a pivot in such a manner as to be slightly oscillatable with respect to the thrust collar surface of the shaft member. During a steady operation of the exhaust turbine, the large-scale electrical generator or other devices, lubricant flows between the thrust collar surface and sliding surfaces of the sliding members as the shaft member rotates. In the situation, since the sliding member can oscillate, a gap between the sliding surface and the thrust collar surface gradually decreases in the rotation direction. A dynamic pressure is therefore produced by a wedge effect, thereby the lubricant forms a fluid film. This fluid film supports an axial load of the rotation shaft. In general, a center of the oscillation of the sliding member having the partially annular shape positions at a circumferential center and a radial center of the sliding member. A fluid film has a pressure distribution such that a maximum pressure generates at the oscillation center of the sliding member (see e.g. paragraph [0020], FIG. 2 in JP-A-2015-94373).

As the sliding member for the thrust bearing, a sliding member including a resin sliding layer coated on a back metal layer has been known. JP-A-10-204282 and JP-A-2016-079391 disclose a resin composition including fibrous particles, such as glass fibrous particles, carbon fibrous particles or intermetallic compound fibrous particles, dispersed in synthetic resin to increase strength of the sliding layer. JP-A-2013-194204 discloses to disperse fibrous particles in a resin matrix in a non-oriented or isotropic manner, to prevent the fiber-reinforced resin composition from having anisotropy of strength.

SUMMARY OF THE INVENTION

During a steady operation of an exhaust turbine, a large-scale electrical generator or other devices, a fluid film, such as oil film, is formed between a shaft member and a sliding member. Thus, a direct contact between a surface of the shaft member and a sliding surface of the sliding member is prevented. However, particularly in a state of high-speed rotation of the shaft during the operation, centrifugal force effects on the fluid film strongly. Then, a resin composition in the vicinity of the sliding surface near a oscillation center where the fluid film effects a maximum pressure (near circumferential center and radial center of sliding member having a partially annular shape) is pressed by the pressure of the fluid film and elastically deforms outwards along a radial direction of the sliding member.

In the case, if the resin composition includes non-oriented or isotropically dispersed fibrous particles as disclosed in JP-A-2013-194204, the resin composition in the vicinity of the sliding surface is largely deformed, and damages such as cracking possibly occurs on the surface of the sliding layer. The damages also occur in the case where a greater ratio of fibrous particles are dispersed such that a major axis thereof is directed perpendicular to the sliding surface.

On the contrary, if a greater ratio of fibrous particles are orientated in the sliding layer such that a major axis thereof is directed parallel to the sliding layer, the elastic deformation of the resin composition in the radially outward of the sliding member caused by the pressure of the fluid film decreases. Even then, the damages of the sliding layer can not be completely prevented, and furthermore another problem is raised that shearing is easily generated at an interface between the back metal layer and the sliding layer.

Accordingly, an object of the present invention is to overcomes the above problems of the conventional technologies, and provide a sliding member, for a thrust bearing, which is hardly subjected to damages such as cracking on a surface of a sliding layer during an operation of a bearing device, and also to shearing between the sliding layer and a back metal layer.

According to an aspect of the present invention, provided is a sliding member for a thrust bearing, including a back metal layer and a sliding layer on the back metal layer. The sliding member has a partially annular shape. The sliding layer of the sliding member includes synthetic resin, and fibrous particles dispersed in the synthetic resin at a volume ratio of 10 to 35% of a volume of the sliding layer. The fibrous particles have an average particle size of 5 to 25 µm. The fibrous particles having a major axis length of not shorter than 20 µm are included at a volume ratio of not less than 10% in relation to a volume of total fibrous particles in a structure, when viewed in a cross section parallel to a central axis of the sliding member and perpendicular to a sliding surface of the sliding layer (hereinafter referred to as "axial cross section" and the structure in the cross-section is referred to as "axial cross sectional structure").

The "central axis of the sliding member" herein refers to a radial virtual axis passing through the circumferential center of the partially annular shape of the sliding member.

In the axial cross-sectional structure, a "sliding surface side area" is defined as an area from the sliding surface toward an interface between the sliding surface and the back metal layer, which has a thickness of 25% of a sliding layer thickness. An "interface side area" is defined as an area from the interface toward the sliding surface, which has a thickness of 25% of the sliding layer thickness. An "intermediate area" is defined as an area between the sliding surface side area and the interface side area. Then, in the sliding surface side area, the fibrous particles have a major axis length of not shorter than 20 µm have a dispersion index of 1.1 to 6. In the intermediate area, the fibrous particles having a major axis length of not shorter than 20 µm have the dispersion index of 0.1 to less than 1. In the interface side area, the fibrous particles having a major axis length of not shorter than 20 µm have the dispersion index of 1.1 to 6.

Here, the dispersion index is defined as an average of ratios $X1/Y1$ of the fibrous particles, where $X1$ is a length of a fibrous particle parallel to the sliding surface in the axial cross-sectional structure, and $Y1$ is a length of the fibrous particle perpendicular to the sliding surface in the axial cross-sectional structure.

According to an embodiment of the invention, the fibrous particles having a major axis length of not shorter than 20 μm in the axial cross-sectional structure preferably have an average aspect ratio of 1.5 to 10. Further preferably, the average aspect ratio is 5 to 10.

According to an embodiment, a volume ratio of the fibrous particles having a major axis length of not shorter than 20 μm is preferably not less than 30% in relation to the volume of total fibrous particles in the axial cross-sectional structure.

According to an embodiment, the fibrous particles are preferably one or more selected from a group consisting of glass fibrous particles, ceramic fibrous particles, carbon fibrous particles, aramid fibrous particles, acrylic fibrous particles, and polyvinyl alcohol fibrous particles.

According to an embodiment, the synthetic resin is preferably one or more selected from a group consisting of polyether ether ketone, polyether ketone, polyether sulfone, polyamide imide, polyimide, polybenzimidazole, nylon, phenol, epoxy, polyacetal, polyphenylene sulfide, polyethylene, and polyether imide.

According to an embodiment, it is preferable that the sliding layer further comprises one or more solid lubricants selected from a group consisting of graphite, molybdenum disulfide, tungsten disulfide, boron nitride, and polytetrafluoroethylene.

According to an embodiment, it is preferable that the sliding layer further comprises 1 to 10% by volume of one or more fillers selected from a group consisting of $CaF_2$, $CaCo_3$, talc, mica, mullite, iron oxide, calcium phosphate, potassium titanate, and $Mo_2C$ (molybdenum carbide).

According to an embodiment, the back metal layer preferably comprises a porous metal portion on its surface at an interface between the back metal layer and the sliding layer.

According to another aspect of the present invention, a thrust bearing including a plurality of the above sliding members is provided.

DESCRIPTION OF THE EMBODIMENT

Figure 6:
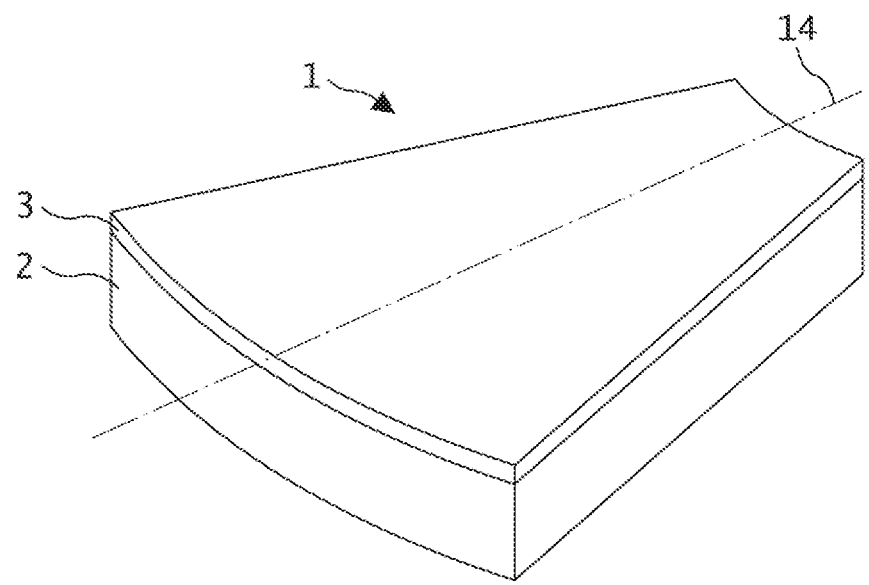
FIG. 6 is a schematic view depicting a sliding member according to an embodiment of the present invention.

FIG. 6 schematically illustrates an embodiment of a sliding member 1 according to the present invention. The sliding member 1 is flat, and the flat surface has a partial annular shape, which corresponds to a part of an annulus having a shape obtained by cutting an annulus along two radii of the annulus. A center angle of the partial annular shape preferably ranges from 25° to 60°, although the center angle is not limited to this range. The sliding member 1 includes a back metal layer 2 having a partial annular flat-plate shape, and a sliding layer 3 on the back metal layer 2.

A circumferential direction of an imaginary annulus forming the partial annular shape is hereinafter referred to as a "circumferential direction". A radial direction of the annulus is hereinafter referred to as a "radial direction". A radial imaginary line passing through the circumferential center of the partial annular shape (and passing through a center of a plate thickness of the sliding member 1) is referred to as a central axis 14.

Figure 1:
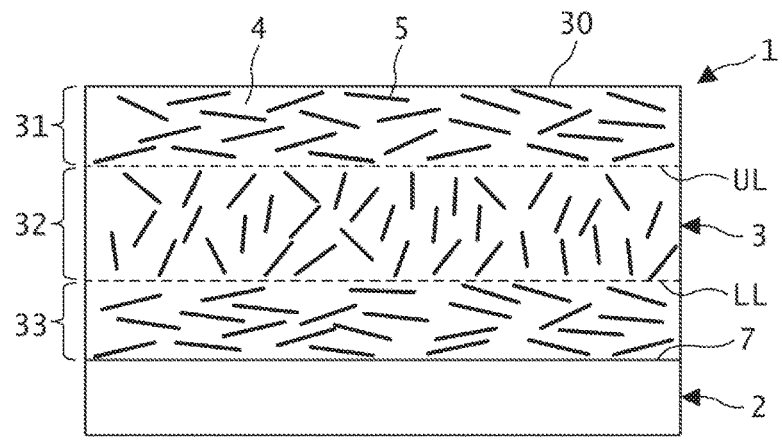
FIG. 1 is a view depicting an axial cross section of a sliding member according to an embodiment of the present invention.

FIG. 1 schematically depicts an axial cross section of the sliding member 1 according to an embodiment of the present invention. As described above, the "axial cross section" in this context is defined as a cross section taken in the direction perpendicular to a sliding surface 30 of the sliding layer 3 and parallel to the central axis 14 of the sliding member 1. Accordingly, the axial cross section indicates a cross section of the sliding member 1 taken in parallel to a radial direction passing through an oscillation center or a vicinity of the oscillation center when the sliding member 1 is used as a thrust bearing. A direction where the fluid film applies the maximum pressure can be observed from the axial cross section.

The sliding member 1 includes a back metal layer 2, and a sliding layer 3 on the back metal layer 2. The sliding layer 3 includes 10 to 35 volume % of fibrous particles 5 dispersed in synthetic resin 4. The fibrous particles 5 have an average particle size of 5 to 25 μm. Fibrous particles 5 having a major axis length of not shorter than 20 μm occupy a volume ratio of not less than 10% in relation to a volume of total fibrous particles 5 when observed in an axial cross-sectional structure of the sliding member 1. The volume ratio is preferably not less than 30%. The "major axis length" in this context refers to a length of a fibrous particle along a direction in which the particle has maximum length.

The average particle size of the fibrous particles 5 of the sliding member 1 is determined as 5 to 25 μm for the following reason. When the average particle size is smaller than 5 μm, an effect of increasing strength (resistance to deformation) of the sliding layer 3 decreases. When the size exceeds 25 μm, shearing is easily generated in the fibrous particles 5 under a load applied to the sliding layer 3 from the shaft member.

The ratio of the fibrous particles 5 in the sliding layer 3 of the sliding member 1 is determined as 10 to 35 volume % for the following reason. When the ratio is smaller than 10%, strength (resistance to deformation) of the sliding layer 3 decreases. When the ratio exceeds 35%, the sliding layer 3 becomes brittle and thus an amount of abrasion easily increases during sliding.

The synthetic resin 4 is preferably one or more selected from polyether ether ketone, polyether ketone, polyether sulfone, polyamide imide, polyimide, polybenzimidazole, nylon, phenol, epoxy, polyacetal, polyphenylene sulfide, polyethylene, and polyether imide. The fibrous particles 5 are preferably one or more selected from glass fibrous particles, ceramic fibrous particles, carbon fibrous particles, aramid fibrous particles, acrylic fibrous particles, and polyvinyl alcohol fibrous particles. However, the synthetic resin 4 and the fibrous particles 5 may be of other materials.

The sliding layer 3 may further include one or more solid lubricants selected from graphite, molybdenum disulfide, tungsten disulfide, boron nitride, and polytetrafluoroethylene. The solid lubricant/lubricants can improve sliding properties of the sliding layer 3. The sliding layer 3 may further include 1 to 10 volume % of one or more fillers selected from $CaF_2$, $CaCO_3$, talc, mica, mullite, iron oxide, calcium phosphate, potassium titanate, and $Mo_2C$ (molybdenum carbide). The filler/fillers can improve abrasion resistance of the sliding layer 3.

The sliding layer 3 preferably has a thickness of 0.5 to 6 mm where the thickness of the sliding member is defined as a distance from the sliding surface 30 to the interface 7 between the sliding layer 3 and the back metal layer 2 in a direction perpendicular to the sliding surface 30.

The sliding layer 3 is divided in following three regions in the axial cross-sectional structure of the sliding member 1:

a "sliding surface side area 31" extending from the sliding surface 30 toward the interface 7 by a length of 25% of the thickness T, where T is a thickness of the sliding layer 3;

an "interface side area 33" extending from the interface 7 toward the sliding surface 30 by a length of 25% of the thickness T; and an "intermediate area 32" positioned between the "sliding surface side area 31" and the "interface side area 33".

Then, the "fibrous particles 5 having a major axis length of not shorter than 20 μm" dispersed in the sliding surface side area 31 have a dispersion index S of 1.1 to 6. The "fibrous particles 5 having a major axis length of not shorter than 20 μm" dispersed in the intermediate area 32 have a dispersion index S of not less than 0.1 to less than 1, preferably 0.1 to 0.9. The "fibrous particles 5 having a major axis length of not shorter than 20 μm" dispersed in the interface side area 33 have a dispersion index S of 1.1 to 6.

Here, the dispersion indexes S is defined as an average ratio X1/Y1 of the fibrous particles 5, where, X1 is a length of a fibrous particle 5 parallel to the sliding surface 30 in the cross-sectional structure, and Y1 is a length of the fibrous particle 5 perpendicular to the sliding surface 30 in the cross-sectional structure.

Figure 1A:
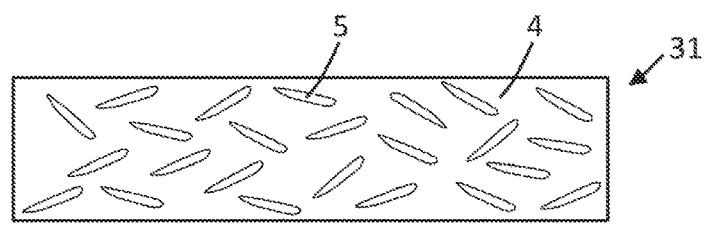
FIG. 1A is an enlarged view depicting a sliding surface side area of a sliding layer of the sliding member in FIG. 1.
Figure 1B:
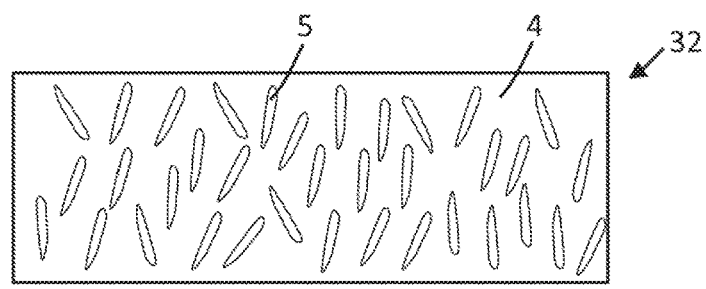
FIG. 1B is an enlarged view depicting an intermediate surface area of the sliding layer of the sliding member in FIG. 1.
Figure 1C:
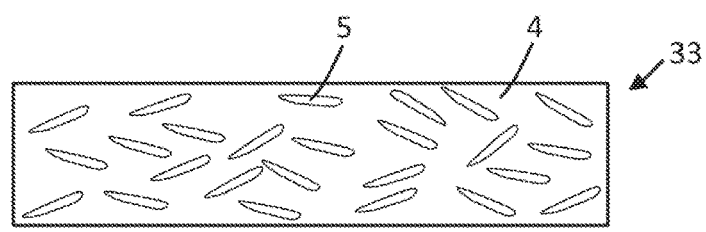
FIG. 1C is an enlarged view depicting an interface side area of the sliding layer of the sliding member in FIG. 1.

FIGS. 1A through 1C schematically illustrate the cross section of the respective areas.

According to the embodiment of the present invention, the fibrous particles 5 having a major axis length of not shorter than 20 μm occupy a volume ratio of not less than 10% in relation to a volume of total fibrous particles 5. The "fibrous particles having a major axis length of not shorter than 20 μm" have a large effect in increasing a strength, or resistance to deformation, of the sliding layer 3. When the volume ratio of the "fibrous particles having a major axis length of not shorter than 20 μm" in relation to the volume of the total fibrous particles 5 is not less than 10%, the strength or the resistance to deformation is increased in a direction where major axes of the "fibrous particles having a major axis length of not shorter than 20 μm" orient in the sliding surface side area 31, the intermediate area 32, and the interface side area 33.

The dispersion index S of the fibrous particles 5 is 1.1 to 6 in the sliding surface side area 31 of the sliding layer 3 in the axial cross-sectional structure. The value of the dispersion index indicates that a large percentage of the fibrous particles 5 are orientated such that the major axis thereof is directed along the sliding surface 30. Thus, the sliding surface side area 31 therefore exhibits such an anisotropic property that it has higher strength (high resistance to deformation) to a load applied parallel to the sliding surface 30, while it has lower strength (low resistance to deformation) to a load applied perpendicular to the sliding surface 30.

On the other hand, the dispersion index S of the fibrous particles 5 is 01 to less than 1 in the intermediate area 32 of the sliding layer 3, more preferably 0.1 to 0.9. Thus, a large percentage of the fibrous particles 5 are orientated such that the major axis thereof is perpendicular to the sliding surface 30. Accordingly, the intermediate area 32 has an anisotropic property in a different direction from that of the sliding surface side area 31. Thus, the intermediate area 32 exhibits such a property that it has lower strength (lower resistance to deformation) to a load applied parallel to the sliding surface 30, and it has higher strength (high resistance to deformation) to a load applied perpendicular to the sliding surface 30.

The dispersion index S of the fibrous particles 5 in the interface side area 33 of the sliding layer 3 is 1.1 to 6. This index indicates that a larger ratio of the fibrous particles 5 are orientated such that the major axis thereof is directed along the sliding surface 30, similarly to the sliding surface side area 31. Accordingly, the interface side area 33 of the sliding layer 3 also has such a property that it has higher strength (high resistance to deformation) to a load applied parallel to the sliding surface 30, and it has lower strength (lower resistance to deformation) to a load perpendicular to the sliding surface 30.

Since the fibrous particles 5 have the above orientations, the resistance to deformation of the sliding surface side area 31 increases to a load applied parallel to the sliding surface 30, while the resistance to deformation of the intermediate area 32 to the load decreases. During an operation of the bearing device, the shaft member rotates at a high speed and a high pressure is generated in the fluid film due to an effect of centrifugal force. Even though sliding occurs between the shaft member and the sliding surface 30 of the sliding layer 3, the intermediate area 32 elastically deforms in the direction parallel to the sliding surface 30. Accordingly, the resin composition in the vicinity of the sliding surface of the sliding surface side area 31 of the sliding layer 3 is not subjected to excessive elastic deformation in the direction in which the pressure of the fluid film applies, i.e. in the radial direction. As a result, the sliding surface 30 is prevented from cracking.

As well, the resistance to deformation of the interface side area 33 of the sliding layer 3 in the direction parallel to the sliding surface 30 is larger than that of the intermediate area 32. Thus, the load produced by the pressure of the fluid film and applied to the sliding layer 3 elastically deforms the intermediate area 32, and therefore the load does not reach an area around the interface between the interface side area 33 and the back metal layer 2. Even when a slight load, or stress, is transmitted to the interface, the stress causes only small deformation at the interface side area 33 since it has higher strength (higher resistance to deformation) in the radial direction parallel to the sliding surface 30. Accordingly, shearing is hardly generated between the back metal layer 2 and the resin composition of the interface in the vicinity of the area in contact with the back metal layer 2 due to different elastic deformations.

The above mechanism therefore prevents the surface of the sliding layer 3 of the sliding member 1 from damages such as cracking, even when the shaft member rotates at a high speed and a high pressure of the fluid film due to centrifugal force acts on the sliding surface 30 of the sliding layer 3 during an operation of the bearing device. The pressure of the fluid film produced by centrifugal force acts in the radial direction, and becomes maximum in the vicinity of the oscillation center. Accordingly, structural control in the radial direction (or the axial direction) in the vicinity of the oscillation center is particularly important.

A substantially same amount of the fibrous particles 5 may be included in the sliding surface side area 31, the intermediate area 32, and the interface side area 33 of the sliding layer 3. Similarly, a substantially same amount of the "fibrous particles having a major axis length of not shorter than 20 µm" may be included in the respective areas 31 to 33.

The dispersion index of the "fibrous particles having a major axis length shorter than 20 µm" dispersed in the sliding surface side area 31, the intermediate area 32, and the interface side area 33 of the sliding layer 3 may be substantially equivalent to the dispersion index of the "fibrous particles having a major axis length of not shorter than 20 µm" dispersed in the respective areas 31 to 33.

Unlike the configuration of the embodiment of the present invention described above, in a conventional sliding member including fibrous particles dispersed in a non-oriented or isotropic manner throughout a sliding layer, the situation differs from that of the invention. In the conventional sliding member, a resin composition in the vicinity of the sliding layer surface near a central portion of the sliding member having a partially annular shape, where a pressure of a fluid film between a thrust collar surface of a shaft member and a sliding surface becomes maximum, is pressed by a high pressure of the fluid film under an effect of centrifugal force. Thus, elastic deformation of the resin increases radially outwards of the sliding member having the partially circular shape, as the shaft member rotates at a high speed during an operation of a bearing device. In this case, damages, such as cracking leading to abrasion, are easily produced in the surface of the sliding layer.

Moreover, in a conventional sliding member which including a sliding layer including fibrous particles, of which major axis are oriented substantially in parallel to the radial direction of the sliding member having the partially annular shape, as well as substantially in parallel to the sliding surface throughout the sliding layer, strength parallel to the sliding surface increases throughout the sliding layer. In this case, a load produced by the pressure of the fluid film and applied to the surface of the sliding layer reaches the interface between the sliding layer and the back metal layer. Thus, a shearing force is generated by an elastic deformation difference between the back metal layer made of a metal and the sliding layer made of synthetic resin. When a small shearing is generated, shearing expends from this start point, leading to exfoliation in some cases.

The "fibrous particles having a major axis length of not shorter than 20 µm" in the axial cross-sectional structure of the sliding member 1 according to the embodiment of the present invention preferably have an average aspect ratio of 1.5 to 10, more preferably 5 to 10, and further more preferably 7 to 10. When the average aspect ratio is smaller than 1.5, the effect of increasing the strength (resistance to deformation) of the resin layer 3 decreases. In this case, the anisotropic difference in the resistance to deformation is more likely to become insufficient for producing the effect even when the above three areas may have different orientations of the "fibrous particles having a major axis length of not shorter than 20 µm". When the average aspect ratio exceeds 10, the fibrous particles 5 may be subjected to shearing when a load is applied to the sliding layer 3 from the shaft member.

Figure 4:
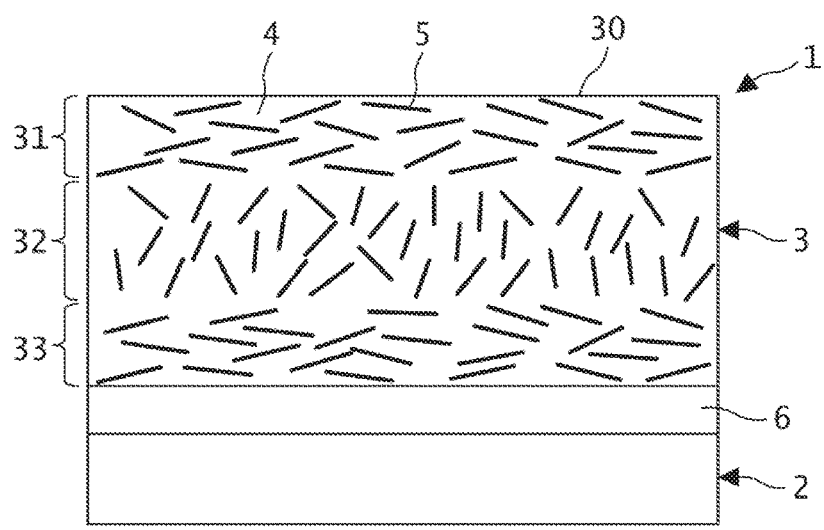
FIG. 4 is a view depicting an axial cross section of a sliding member according to another embodiment of the present invention.

The back metal layer 2 may include a porous metal portion 6 on its surface that is an interface between the back metal layer 2 and the sliding layer 3. FIG. 4 schematically depicts an axial cross section of the sliding member 1 in an embodiment in which the back metal layer 2 includes the porous metal portion 6. When the porous metal portion 6 is formed on the surface of the back metal layer 2, bonding strength between the sliding layer 3 and the back metal layer 2 increases. More specifically, the porous metal portion 6 increases a bonding force between the back metal layer 2 and the sliding layer 3 by an anchor effect, that is, a material of the sliding layer 3 impregnates in pores of the porous metal portion 6.

The porous metal portion 6 may be produced by sintering a metal powder such as Cu, Cu alloy, Fe, or an Fe alloy on a surface of a metal plate, a strip or the like. The porous metal portion 6 may have porosity of approximately 20 to 60%. The porous metal portion 6 may have a thickness of approximately 50 to 500 µm. In this case, the sliding layer 3 coated on a surface of the porous metal portion 6 may have a thickness of 0.5 to 6 mm. However, these dimensions are mere examples, and other dimensions may be adopted.

The above sliding member may be used for e.g. a thrust bearing. For example, this bearing includes a housing having an annular recess. A plurality of the sliding members are arranged in the annular recess in a circumferential direction to support a thrust collar surface of the shaft member, i.e. an opposed shaft. The sliding member has a partially annular shape. The shape (e.g., curvature and size) is designed to match with the annular recess and the shaft member. However, the sliding member may be also used for other bearings or for other sliding applications.

The present invention is also directed to a thrust bearing including a plurality of sliding members.

A process of manufacturing the above sliding member is described in detailed hereinafter.

(1) Preparation of Fibrous Particle Material

Examples of the material of the fibrous particles include artificially produced inorganic fibrous particles (e.g., glass fibrous particles or ceramic fibrous particles), and organic fibrous particles (e.g., carbon fibrous particles, aramid fibers, acrylic fibrous particles, or polyvinyl alcohol fibrous particles).

(2) Preparation of Synthetic Resin Material Particles

Particles having an average particle size of 7 to 30 µm and an aspect ratio of 5 to 100 are preferable for the synthetic resin material. The synthetic resin may be one or more selected from polyether ether ketone, polyether ketone, polyether sulfone, polyamide imide, polyimide, polybenzimidazole, nylon, phenol, epoxy, polyacetal, polyphenylene sulfide, polyethylene, and polyether imide.

(3) Manufacture of Resin Composition Sheet

A resin composition sheet is produced from the above materials or other with use of a melt-kneading machine, a supply mold, a sheet forming mold, and drawing rolls.

"Melt-Kneading Machine"

The melt-kneading machine mixes the synthetic resin material particles, the fibrous particle material, and other optional materials, such as solid lubricant o filler, while heating the materials at a temperature of 185 to 370° C. to produce a resin composition in a molten state. The molten resin composition is extruded from the melt-kneading machine under fixed pressure.

"Supply Mold"

The molten resin composition extruded from the melt-kneading machine is constantly supplied to the sheet forming mold via the supply mold in a constant amount. The supply mold has a heater to heat the resin composition passing through the supply mold at 175 to 360° C. to maintain the resin composition in a molten state.

"Sheet Forming Mold"

The resin composition is formed into a sheet shape by the sheet forming mold. The sheet forming mold includes a cooling fluid passage inside a mold wall of the mold to cool the sheet-shaped resin composition. The molten resin composition supplied from the supply mold to the sheet forming mold is formed into a sheet shape, and then cooled while the sheet moves toward an outlet of the sheet forming mold. Accordingly, the resin composition gradually increasing its viscosity and starts to solidify, and the sheet is completely solidified before drawn out through the outlet of the forming mold. An example of a thickness of the sheet is 1 to 7 mm.

"Drawing Rolls"

The resin composition sheet is successively drawn out from the "sheet forming mold" with use of the drawing rolls. As the rolls, at least a pair of rolls moves the resin composition sheet with pressing it from both sides of the sheet. The drawing rolls are rotated in a controllable manner by an electric motor.

The completed resin composition sheet is cut in a size matched with the size of back metal used in a coating step described below.

(4) Back Metal

As the back metal layer, a metal plate made of an Fe alloy such as a hypoeutectoid steel or a stainless steel, Cu, a Cu alloy or the like may be used. A porous metal portion may be formed on a surface of the back metal layer, i.e., on the side facing an interface between the back metal layer and the sliding layer. The porous metal portion may have a same composition as the back metal layer. Alternatively, the porous metal portion may have a different composition from the back metal layer.

(5) Coating and Molding Step

The resin composition sheet is bonded to one surface of the back metal layer, or to the porous metal portion of the back metal. Subsequently, the back metal with the resin composition sheet is molded in a shape for use, such as a partially annular shape, by pressing. Then, a surface of the sliding layer and the back metal are processed or cut to make a thickness of the composition uniform. The molding is performed such that a drawn direction of the resin composition sheet in the sheet forming step becomes substantially parallel to a direction of the central axis of the partially annular shape of the sliding member.

Structure Control

A structure control method for controlling orientations of the fibrous particles is hereinafter described. The control is conducted by cyclically varying a drawing speed of a resin composition sheet by the drawing rolls during the manufacturing step of the resin composition sheet. At a minimum speed in this control, the molten resin composition is sufficiently supplied from the melt-kneading machine to fill the sheet forming mold at a supply pressure (or at an extrusion pressure). At a maximum speed, a slight shortage of the supply of the molten resin composition occurs for filling the sheet forming mold. For example, when a volume rate of the molten resin composition completely filling the sheet forming mold at the supply pressure is assumed to be 100, the maximum speed is determined such that the volume ratio of the resin composition sheet drawn out from the mold is approximately 120.

The cycle from the minimum to the maximum speed should be varied depending on an internal volume of the sheet forming mold, that corresponds to a volume of the molten resin within the mold. For example, when the resin composition sheet has a thickness of 1 to 7 mm and a width of 150 to 800 mm, the cycle may be approximately 5 to 10 seconds.

When the drawing speed changes from a lower speed to a higher speed and reaches close to the maximum speed, a solidified portion of the resin composition sheet moves ahead toward an outlet of the mold, while molten or semi-molten portion delays. Thus, a slight gap is produced between the solidified portion and the molten or semi-molten portion. In a subsequent change from the higher to the lower speed, molten or semi-molten resin composition is extruded from the melt-kneading machine at a fixed supply pressure and flows toward the outlet, and catches up with the solidified portion of the resin composition having gone ahead. As a result, the gap is disappears. During the molten or semi-molten resin composition flows in the gap and hit the solidified portion, disturbance of the flow of the resin composition is generated.

Figure 5:
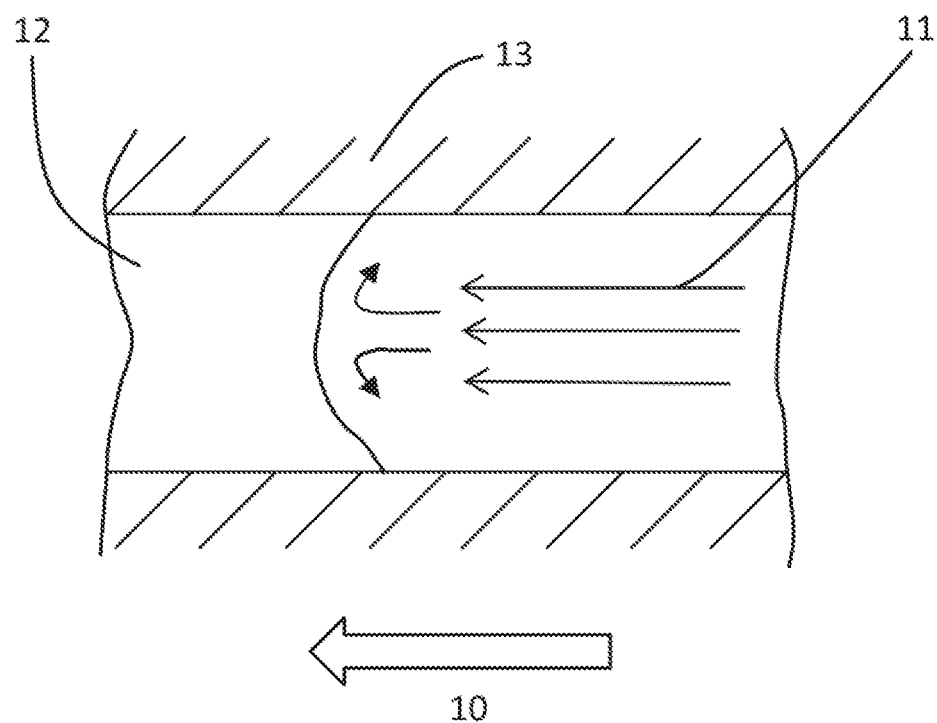
FIG. 5 is a view depicting a flow of molten resin.

FIG. 5 schematically illustrates this situation. The resin composition sheet is drawn out in the direction from the right to the left in the figure (drawing direction is designated by reference "10"). The flow of the molten or semi-molten resin composition 11 is indicated by arrows. The molten or semi-molten resin composition 11 flows from the supply mold (flowing from the right side in the figure) collides with a solidified resin composition 12, and further flows toward a surface of the sheet along the solidified portion 12 while producing disturbance. At the surface area, the molted or semi-molten resin composition 11 flows along a surface of the sheet forming mold 13 and solidifies. Therefore, disturbance is hardly produced in the surface area. Accordingly, the fibrous particles in a central area of the sheet in a thickness direction is likely to have an orientation that the major axis thereof directs perpendicular to the surface of the sheet. In a surface area, however, the major axis of the fibrous particles is likely to oriented parallel to the surface of the sheet.

In a conventional method, the drawing speed of the resin composition sheet by the drawing rolls is kept constant. Thus, the molten resin composition constantly flows in one direction toward the outlet of the sheet forming mold. Accordingly, the fibrous particles have the major axis orientated parallel to a surface of the sheet throughout the sheet.

When the resin composition sheet is manufactured by a conventional injection molding, the molten resin composition is injected in a moment from a supply port of the sheet forming mold. In this case, collision and junction of the molten resin composition occur at various positions within the mold. The collision and junction of the resin composition produce a difference of the orientation between a portion where the resin composition flows in one direction and a portion where the collision occurs. As a result, the resin composition sheet has a mixture of portions where the fibrous particles are orientated parallel to the surface of the sheet and portions where the fibrous particles are oriented at random (weld portions) as viewed from the surface.

When a resin composition sheet is manufactured from a resin composition including synthetic resin, cross-linking promotor, and fibrous particles by injection molding as described in JP-A-2013-194204, the fibrous particles are dispersed in a non-oriented (isotropic) manner.

Measuring Method

The average particle size of the fibrous particles is measured as follows. Electron images of a plurality of positions in an axial cross-section of the sliding member are taken with use of an electronic microscope at 200 magnifications. More specifically, the average particle size of the fibrous particles is obtained by measuring an area of each fibrous particle from the electron images by a typical image analysis method (analysis software: Image-Pro Plus (version 4.5) manufactured by Planetron Inc.), and a diameter of a circle having the measured area is calculated (equivalent circle diameter) and an average is obtained. However, the magnification is not limited to 200 and other magnification may be used.

Next, measuring of a volume ratio of fibrous particles having a major axis length of not shorter than 20 μm in relation to the total volume of the fibrous particles in the sliding layer is explained below. The fibrous particles in the above images are classified into a group of fibrous particles having a major axis length of not shorter than 20 μm and a group of the other fibrous particles with use of a typical image analysis method (e.g., analysis software: Image-Pro Plus (version 4.5) manufactured by Planetron Inc.). A total area of all the fibrous particles observed in the images, and a total area of the fibrous particles having a major axis length of not shorter than 20 μm in the images are measured. Thus, a ratio of the total area of the fibrous particles having a major axis length of not shorter than 20 μm in relation to the total area of all fibrous particles is obtained. Please note that the area ratio represent a volume ratio.

Next, a method for sectioning the sliding layer into the sliding surface side area, the intermediate area, and the interface side area is explained. A thickness T of the sliding layer in the direction perpendicular to the sliding surface is measured from the above electron images. A virtual line UL is drawn in parallel to the sliding surface, such that the line UL positions at a distance of 25% of the thickness T (that is, ¼ *T) from the sliding surface toward the back metal layer. A virtual line LL is also drawn in parallel to the sliding surface such that the line LL positions at a distance of 25% of the thickness T (that is, ¼ *T) from the interface toward the sliding surface. An area between the sliding surface of the sliding layer and the virtual line UL is defined as a "sliding surface side area", while an area between the virtual line LL and the interface is defined as an "interface side area". An area between the virtual line UL and the virtual line LL is defined as an "intermediate area". The virtual lines UL and LL are depicted by dotted lines in FIG. 1.

When the back metal layer includes a porous portion on its surface, the surface of the back metal layer has recesses and protrusions. In this case, the interface between the sliding layer and the back metal layer is assumed as a virtual line in parallel to the sliding surface, which passes through a top portion of a protrusion of the surface of the back metal layer (that is the porous portion) closest to the sliding surface.

Figure 2:
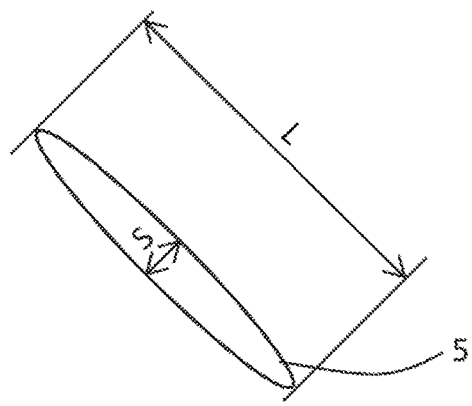
FIG. 2 is a view of a fibrous particle for explaining an aspect ratio (A).

The average aspect ratio A is obtained as an average ratio of a major axis length L to a minor axis length S (major axis length L/minor axis length S) of the fibrous particles having a major axis length of not shorter than 20 μm from the electron images taken by the above method (see FIG. 2) The major axis length L of the fibrous particle indicates a length measured in a first direction in which the particle has a maximum length in the electron image, while the minor axis length S indicates a maximum length measured in a second direction perpendicular to the first direction.

Figure 3:
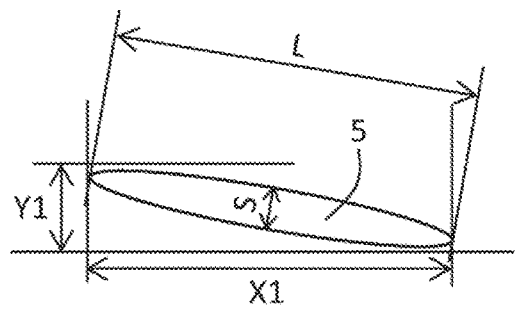
FIG. 3 is a view of a fibrous particle for explaining a dispersion index (S).

The dispersion index S of the fibrous particles is obtained by measuring a length X1 of the fibrous particle having a major axis length of not shorter than 20 μm in the direction parallel to the sliding surface, and the length Y1 of the fibrous particle in the direction perpendicular to the sliding surface, and calculating an average ratio of X1/Y1 based on the electron images (see FIG. 3). As the dispersion index S of the fibrous particles indicates a value closer to zero, the dispersed fibrous particles are more oriented in the direction perpendicular to the sliding surface. As the dispersion index S indicates a larger value greater than 1.1, the major axis is more oriented in the direction parallel to the sliding surface.

EXAMPLES

For the sliding members including a back metal layer and a sliding layer, Examples 1 to 10 according to the invention and Comparative Examples 11 to 17 were produced as follows. Table 1 shows compositions of sliding layer of sliding member of Examples 1 to 10 and Comparative Examples 11 to 17.

TABLE 1

| | | Composition (volume %) | | | | | | | Fibrous particle | |
| | | Synthetic resin | | Fibrous particle | | Solid lubricant | | Filler | Cross-linking promotor | Average particle size (μm) | Average aspect ratio (A) |
| Sample | | PEEK | PF | Carbon fiber | Glass fiber | Gr | MoS2 | CaF2 | | | |
|---|---|---|---|---|---|---|---|---|---|---|---|
| Example of the invention | 1 | 90 | — | 10 | — | — | — | — | — | 5 | 1.4 |
| | 2 | 80 | — | — | 20 | — | — | — | — | 25 | 3.4 |
| | 3 | 70 | — | 30 | — | — | — | — | — | 10 | 3.8 |
| | 4 | 75 | — | 20 | — | — | — | 5 | — | 20 | 5.4 |
| | 5 | 70 | — | 25 | — | — | 5 | — | — | 23 | 6.4 |
| | 6 | 65 | — | 35 | — | 5 | — | 5 | — | 22 | 7.2 |
| | 7 | 60 | — | — | 20 | — | 10 | 10 | — | 21 | 9.4 |
| | 8 | 70 | — | 15 | — | 5 | — | 10 | — | 21 | 10 |
| | 9 | 75 | — | — | 15 | — | 5 | 5 | — | 22 | 5.6 |
| | 10 | — | 75 | — | 25 | — | — | — | — | 5 | 1.6 |
| Comparative Example | 11 | 70 | — | — | 30 | — | — | — | — | 4 | 1.3 |
| | 12 | 70 | — | — | 30 | — | — | — | — | 29 | 3.2 |
| | 13 | 95 | — | 5 | — | — | — | — | — | 21 | 3.3 |
| | 14 | 60 | — | 40 | — | — | — | — | — | 15 | 3.6 |
| | 15 | 70 | — | — | 30 | — | — | — | — | 15 | 3.2 |
| | 16 | 75 | — | 25 | — | — | — | — | — | 23 | 3.5 |
| | 17 | — | 70 | 25 | — | — | — | — | 5 | 10 | 3.1 |

TABLE 1-continued

|  |  | Fibrous particle | | | Evaluation | | |
|---|---|---|---|---|---|---|---|
|  |  | Dispersion index (S) | | | | | |
| Sample | | Sliding surface side area | Intermediate area | Interface side area | Volume ratio (%) | Cracking | Shearing in interface | Abrasion (μm) |
| Example of the invention | 1 | 3.1 | 0.9 | 3.8 | 11 | Absence | Absence | 22.8 |
|  | 2 | 4.2 | 0.8 | 4.3 | 29 | Absence | Absence | 10.8 |
|  | 3 | 4.6 | 0.8 | 5.1 | 28 | Absence | Absence | 10.2 |
|  | 4 | 5.2 | 0.5 | 4.9 | 34 | Absence | Absence | 7.7 |
|  | 5 | 5.5 | 0.7 | 5.3 | 37 | Absence | Absence | 8.3 |
|  | 6 | 5.4 | 0.6 | 5.7 | 41 | Absence | Absence | 6.3 |
|  | 7 | 4.6 | 0.3 | 5.1 | 35 | Absence | Absence | 7.4 |
|  | 8 | 5.2 | 0.7 | 4.7 | 34 | Absence | Absence | 7.2 |
|  | 9 | 5.5 | 0.1 | 4.4 | 39 | Absence | Absence | 8.1 |
|  | 10 | 3.4 | 0.8 | 3.1 | 12 | Absence | Absence | 20.4 |
| Comparative Example | 11 | 3.2 | 1.2 | 3.7 | 7 | Presence | Presence | 48.5 |
|  | 12 | 3.4 | 1.1 | 3.1 | 25 | Presence | Presence | 32.4 |
|  | 13 | 3.3 | 1.2 | 3.2 | 24 | Presence | Presence | 40.4 |
|  | 14 | 4.1 | 0.9 | 5.1 | 26 | Presence | Presence | 30.6 |
|  | 15 | 5.3 | 5.1 | 5.4 | 29 | Presence | Presence | 35.7 |
|  | 16 | 8.2 | 2.8 | 9.4 | 27 | Presence | Presence | 28.9 |
|  | 17 | 1.1 | 1.2 | 1.3 | 22 | Presence | Absence | 55.1 |

Material particles for the fibrous particles used in Examples 1 to 10 and Comparative Examples 11 to 17 in Table 1 have an average particle size of 7 to 35 μm, and an average aspect ratio (major axis length/minor axis length) of 5 to 100.

The material for the synthetic resin used in Examples 1 to 10 and Comparative Examples 11 to 17 were polyether ether ketone (PEEK) particles or phenol (PF) particles. These particles had an average size of 125% of that of the material of the fibrous particles.

The material particles for the solid lubricant ($MoS_2$, Gr) used in Examples 5 to 9 have an average size of 30% of that of the material of the fibrous particles, while the material particles for the filler ($CaF_2$) have an average size of 25% of that of the material of the fibrous particles. The material particles for the cross-linking promotor used in Comparative Example 17 have an average size of 25% of that of the material of the fibrous particles.

The materials were mixed at the ratios in Table 1. The composition was pressed in a pellet. The pellets were charged in a melt-kneading machine, and then subjected to the supply mold, sheet forming mold, and drawing rolls to produce a resin composition sheet. For Examples 1 to 9 and Comparative Examples 11 to 16, the heating temperature in the melt-kneading machine was set at 350 to 390° C., while the temperature was 230° C. to 250° C. for Example 10. The resin composition sheet was drawn out by the drawing rolls at cyclically varied speed (5 to 10 seconds intervals) for Examples 1 to 10 and Comparative Examples 11 to 14 and 16, while the sheet was drawn out at a constant speed for Comparative Example 15. The resin composition sheet for Comparative Example 17 was produced by injection molding as disclosed in JP-A-2013-194204.

Subsequently, the produced resin composition sheet was coated on one surface of the back metal layer made of an Fe alloy, and then processed into a partially annular shape, which was then cut so that the composition on the back metal layer has a predetermined thickness. While the back metal layer in Examples 1 to 9 and Comparative Examples 11 to 17 was made of an Fe alloy, that of Example 10 includes a porous sintered portion made of Cu alloy on a surface of the Fe alloy. The processing of Examples 1 to 10 and Comparative Examples 11 to 16 was conducted so that the drawn direction of the resin composite sheet is parallel to the radial direction at a circumferential central portion of the partially annular shape.

The sliding layer of the sliding member of Examples 1 to 10 and Comparative Examples 11 to 17 had a thickness of 3 mm and the back metal layer had a thickness of 10 mm. The partially annular shape had an outside diameter of 190 mm, an inside diameter of 100 mm, and a circumferential angle of 30°.

An average particle size of the fibrous particles dispersed in the sliding layer of the sliding member of Examples and Comparative Examples are measured as explained above and the results were shown in the column "average particle size" in Table 1. Also, an average aspect ratio (A) of the "fibrous particles having a major axis length of not shorter than 20 μm" was measured as explained above and the results were shown in the column "average aspect ratio (A)" in Table 1. Each dispersion index (S) of the "fibrous particles having a major axis length of not shorter than 20 μm" dispersed in the sliding surface side area, the intermediate area, and the interface side area of the sliding layer were measured as the above and the results were shown in the column "dispersion index (S)" in Table 1. A volume ratio of the fibrous particles having a major axis length of not shorter than 20 μm in relation to the total volume of the fibrous particles dispersed in the sliding layer was measured and the results were shown in the column "volume ratio" in Table 1.

A plurality of the sliding members each having a partially annular shape were disposed on a base along a circumferential direction of the base so the members are arranged in a circle. A sliding test was conducted under conditions in Table 2. An amount of abrasion of the sliding layer after the sliding test for Examples and Comparative Examples were shown in the column "abrasion (μm)" in Table 1. The surface of the sliding layer was detected at a plurality of positions in the vicinity of the circumferential and radial center portion with a roughness tester to evaluate if any defects were generated after the sliding test for Examples and Comparative Examples. The "presence or absence of cracking" column in Table 1 shows "presence" when a defect having a depth of not less than 5 μm was measured on the surface of the sliding layer, or "absence" when no defect was measured. A test piece after the sliding test was cut in the direction parallel to the radial direction at the circumferential central portion of the sliding member and perpendicular to the sliding surface to check if any shearing occurred at the interface between the sliding layer and the back metal with an optical microscope. The "presence or absence of shearing in interface" column in Table 1 shows "presence" when the "shearing" was detected at the interface, or "absence" when no "shearing" was detected.

TABLE 2

| Testing machine | Thrust sliding tester |
|---|---|
| Load | 40 MPa |
| Rotation speed | 4000 rpm |
| Testing time | 1.5 hours |
| Oil | VG32 |
| Oil feeding rate | 32 litters/minute |
| Oil feeding temperature | 45° C. |
| Opposed shaft | S45C |
| Roughness of opposed shaft | 1.5 Ra |

As seen from the results shown in Table 1, an amount of abrasion after the sliding test of Examples 1 to 10 was smaller than that of Comparative Examples 11 to 17. Particularly, the abrasion was considerably reduced in Examples 4 to 9, of which an average aspect ratio (A) of the fibrous particles is 5 to 10. The abrasion of Examples 4 to 9 was smaller than that of Examples 1 to 3, since Examples 4 to 9 included the fibrous particles "having a major axis length of not shorter than 20 μm" and having an average aspect ratio of 1.5 to 10 at a volume ratio of not less than 30% while Examples 1 to 3 include these particles at a volume ratio smaller than 30%. It is considered that strength (resistance to deformation) of the sliding layer is more increased for Examples 4 to 9 as described above.

Furthermore, no cracking on the surface of the sliding layer and no shearing at the interface were detected after the sliding test in each of Examples of the invention. It is considered that cracking was prevented by the varied dispersion indexes between the sliding surface side area, the intermediate area, and the interface side area of the sliding layer as described above.

In Comparative Example 15, on the other hand, the fibrous particles in the sliding layer have the same orientation (orientation in parallel to sliding surface) between the sliding surface side area, the intermediate area, and the interface side area, and thus the cracking and the shearing were easily generated. In the case, the sliding layer was easily worn and an amount of abrasion increased.

In Comparative Example 11, since the fibrous particles have an average size smaller than 5 μm, it is considered that the effect of increasing the strength (resistance to deformation) of the sliding layer decreased. Thus, cracking on the surface of the sliding layer occurred, leading to increase of abrasion.

In the sliding layer in Comparative Example 12, since the fibrous particles have a large average size of 29 μm, it is considered that the fibrous particles itself broke by shearing when a load was applied to the sliding layer by a high pressure of the fluid film. Thus, cracking on the surface of the sliding layer was generated, leading to increase of abrasion and shearing was generated at the interface between the sliding layer and the back metal.

In Comparative Example 13, since the volume ratio of the fibrous particles in the sliding layer is smaller than 10%, it is considered that the strength (resistance to deformation) of the sliding layer decreased. Thus, cracking occurred on the sliding surface, leading to leading to increase of abrasion, and shearing was generated at the interface between the sliding layer and the back metal.

In Comparative Example 14, the volume ratio of the fibrous particles in the sliding layer exceeds 35%, the sliding layer became brittle. It is therefore considered that cracking occurred in the sliding surface, leading to leading to increase of abrasion, and shearing was generated at the interface between the sliding layer and the back metal.

In Comparative Example 15, since the drawing speed during the drawing step in manufacturing the resin composition sheet was kept constant, the fibrous particles orientated substantially in parallel to the sliding surface of the sliding layer (that is, great dispersion index), in the sliding surface side area, the intermediate area, and the interface side area. Thus, cracking occurred on the sliding surface, leading to leading to increase of abrasion, and shearing was generated at the interface between the sliding layer and the back metal.

In Comparative Example 16, the dispersion index of the fibrous particles in the sliding surface side area and the interface side area of the sliding layer exceeds 6, and the dispersion index of the intermediate area also exceeds 2. It is considered that the effect of in the intermediate area for releasing a load applied by a high pressure of the fluid film decreased. Thus, cracking occurred on the sliding surface, leading to leading to increase of abrasion and shearing was generated at the interface between the sliding layer and the back metal.

In Comparative Example 17, since the resin composition sheet was produced by injection molding, the dispersion index of the fibrous particles in the sliding layer indicates non-orientation throughout the sliding layer. Thus, cracking occurred on the sliding surface, leading to increase of abrasion, when a load was applied by a high pressure of the fluid film.

The invention claimed is:

1. A sliding member for a thrust bearing, comprising:
   a back metal layer; and
   a sliding layer on the back metal layer,
   wherein the sliding member has a partially annular shape,
   wherein the sliding layer comprises at least one synthetic resin and fibrous particles dispersed in the at least one synthetic resin at a volume ratio of 10 to 35% of a volume of the sliding layer, and the fibrous particles have an average particle size of 5 to 25 μm,
   wherein fibrous particles having a major axis length of not shorter than 20 μm among the fibrous particles are included at a volume ratio of not less than 10% in relation to a volume of total fibrous particles, in a cross section of the sliding layer, and the cross section is parallel to a central axis of the sliding member and is perpendicular to a sliding surface of the sliding layer, and
   wherein, when a sliding surface side area is defined as an area from the sliding surface toward an interface between the sliding surface and the back metal layer in the cross section, the sliding surface side area having a thickness of 25% of a sliding layer thickness; an interface side area is defined as an area from the interface toward the sliding surface, the interface side area having a thickness of 25% of the sliding layer thickness; and an intermediate area is defined as an area between the sliding surface side area and the interface side area,
   (i) in the sliding surface side area, the fibrous particles having the major axis length of not shorter than 20 μm have a dispersion index of 1.1 to 6, (ii) in the intermediate area, the fibrous particles having the major axis length of not shorter than 20 μm have the dispersion index of 0.1 to less than 1, and (iii) in the interface side area, the fibrous particles having the major axis length of not shorter than 20 μm have the dispersion index of 1.1 to 6, where the dispersion index is defined as an average of ratios X1/Y1 of the fibrous particles, X1 being a length of a fibrous particle parallel to the sliding surface in the cross section, and Y1 being a length of the fibrous particle perpendicular to the sliding surface in a circumferential cross section.

2. The sliding member according to claim 1, wherein the fibrous particles having the major axis length of not shorter than 20 μm in the cross section have an average aspect ratio of 1.5 to 10.

3. The sliding member according to claim 2, wherein the fibrous particles having the major axis length of not shorter than 20 μm in the cross section have an average aspect ratio of 5 to 10.

4. The sliding member according to claim 1, wherein a volume ratio of the fibrous particles having the major axis length of not shorter than 20 μm is not less than 30% in relation to the volume of total fibrous particles in the cross section.

5. The sliding member according to claim 1, wherein the fibrous particles are one or more selected from a group consisting of glass fibrous particles, ceramic fibrous particles, carbon fibrous particles, aramid fibrous particles, acrylic fibrous particles, and polyvinyl alcohol fibrous particles.

6. The sliding member according to claim 1, wherein the at least one synthetic resin includes one or more selected from a group consisting of polyether ether ketone, polyether ketone, polyether sulfone, polyamide imide, polyimide, polybenzimidazole, nylon, phenol, epoxy, polyacetal, polyphenylene sulfide, polyethylene, and polyether imide.

7. The sliding member according to claim 1, wherein the sliding layer further comprises one or more solid lubricants selected from a group consisting of graphite, molybdenum disulfide, tungsten disulfide, boron nitride, and polytetrafluoroethylene.

8. The sliding member according to claim 1, wherein the sliding layer further comprises 1 to 10% by volume of one or more fillers selected from a group consisting of $CaF_2$, $CaCo_3$, talc, mica, mullite, iron oxide, calcium phosphate, potassium titanate, and $Mo_2C$.

9. The sliding member according to claim 1, wherein the back metal layer comprising a porous metal portion on its surface at an interface between the back metal layer and the sliding layer.

10. A thrust bearing comprising a plurality of the sliding members according to claim 1.

11. A sliding member for a thrust bearing, comprising:

a back metal layer; and a sliding layer on the back metal layer, wherein the sliding member has a partially annular shape, wherein the sliding layer includes at least one synthetic resin, and a plurality of fibrous particles dispersed in the at least one synthetic resin, wherein 10 through 35% of a volume of the sliding layer is the plurality of fibrous particles, and the plurality of fibrous particles has an average particle size of 5 through 25 μm, wherein the plurality of fibrous particles include a group of fibrous particles having a major axis length of equal to or greater than 20 μm, a volume of the group of fibrous particles is equal to or greater than 10% of a total volume of the plurality of fibrous particles, in a cross section of the sliding layer, and the cross section is parallel to a central axis of the sliding member and is perpendicular to a sliding surface of the sliding layer, and wherein in the cross section, a sliding surface side portion is a portion from the sliding surface toward an interface between the sliding surface and the back metal layer, a thickness of the sliding surface side portion is approximately 25% of a thickness of the sliding layer, an interface side portion is a portion from the interface toward the sliding surface, a thickness of the interface side portion is approximately 25% of the thickness of the sliding layer, and an intermediate portion is a portion between the sliding surface side portion and the interface side portion, (i) in the sliding surface side portion, the group of fibrous particles have a dispersion index of 1.1 to 6, (ii) in the intermediate portion, the group of fibrous particles have a dispersion index of 0.1 to less than 1, and (iii) in the interface side portion, the group of fibrous particles have a dispersion index of 1.1 to 6, where each of the group of fibrous particles has a first length X1 parallel to the sliding surface and a second length Y2 perpendicular to the sliding surface in the cross section, and the dispersion index is an average of ratios X1/Y1 of the group of fibrous particles.

* * * * *